United States Patent
Osaki et al.

(10) Patent No.: US 9,132,419 B2
(45) Date of Patent: Sep. 15, 2015

(54) $NO_x$ PURIFICATION CATALYST AND METHOD OF PRODUCING THE SAME

(75) Inventors: Mayuko Osaki, Susono (JP); Yoshiaki Inagaki, Toyota (JP); Atsushi Tanaka, Toyota (JP); Brian Johnson, Cambridge (GB); Andrew Wheatley, Cambridge (GB); Maciej Cabaj, Warsaw (PL); Masaya Ibe, Toyota (JP)

(73) Assignees: TOYOTA JIDOSHA KABUSHIKI KAISHA, Aichi (JP); CAMBRIDGE ENTERPRISE LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/116,694

(22) PCT Filed: Jul. 7, 2011

(86) PCT No.: PCT/JP2011/066030
§ 371 (c)(1),
(2), (4) Date: Nov. 8, 2013

(87) PCT Pub. No.: WO2013/005345
PCT Pub. Date: Jan. 10, 2013

(65) Prior Publication Data
US 2014/0113808 A1    Apr. 24, 2014

(51) Int. Cl.
| | | |
|---|---|---|
| B01J 23/58 | (2006.01) | |
| B01J 23/02 | (2006.01) | |
| B01J 23/89 | (2006.01) | |
| B01J 35/00 | (2006.01) | |
| B01J 35/02 | (2006.01) | |
| B01J 37/02 | (2006.01) | |
| B01D 53/94 | (2006.01) | |

(52) U.S. Cl.
CPC ........... *B01J 23/892* (2013.01); *B01D 53/9422* (2013.01); *B01J 35/002* (2013.01); *B01J 35/006* (2013.01); *B01J 35/023* (2013.01);
(Continued)

(58) Field of Classification Search
CPC ................. B01D 53/9422; B01D 2258/012; B01D 2255/20753; B01D 2255/104; B01J 37/0203; B01J 35/006; B01J 35/023; B01J 35/002; B01J 37/0211
USPC .................. 502/330, 243, 335, 337, 344, 439
See application file for complete search history.

(56) References Cited

U.S. PATENT DOCUMENTS

| | | | |
|---|---|---|---|
| 2007/0093559 A1* | 4/2007 | Norskov et al. ............... | 518/726 |
| 2007/0244003 A1 | 10/2007 | Majima et al. | |
| 2010/0249448 A1* | 9/2010 | Suzuki et al. ................. | 560/208 |

FOREIGN PATENT DOCUMENTS

| | | |
|---|---|---|
| CN | 1835797 A | 9/2006 |
| CN | 1968746 A | 5/2007 |

(Continued)

*Primary Examiner* — Colleen Dunn
*Assistant Examiner* — Haytham Soliman
(74) *Attorney, Agent, or Firm* — Sughrue Mion, PLLC

(57) ABSTRACT

[Problem] The present invention provides a $NO_x$ purification catalyst which utilizes Ag as one of the catalyst components and exhibits $NO_x$ purification performance without adjustment to a special exhaust gas composition, as well as a method of producing the same.

[Means for Solution] The present invention provides a nitrogen oxide purification catalyst in which particulates are supported on a metal oxide carrier, wherein the aforementioned particulates consist of Ag and Ni and the aforementioned Ag and Ni are at least partially alloyed. Also provided is a method of producing the aforementioned catalyst, comprising the step of preparing a colloidal suspension in which the ratio of Ag is 10 to 90 at % with respect to the total amount of Ag and Ni.

6 Claims, 8 Drawing Sheets

(52) U.S. Cl.
CPC .......... *B01J37/0203* (2013.01); *B01J 37/0211* (2013.01); *B01D 2255/104* (2013.01); *B01D 2255/20753* (2013.01); *B01D 2258/012* (2013.01)

(56) References Cited

FOREIGN PATENT DOCUMENTS

| | | | |
|---|---|---|---|
| DE | 25 38 098 A1 | 3/1977 | |
| EP | 0 947 235 A1 | 10/1999 | |
| EP | 1 378 290 A1 | 1/2004 | |
| EP | 2 177 267 A1 | 4/2010 | |
| JP | 11-342339 A | 12/1999 | |
| JP | 2000-218163 A | 8/2000 | |
| JP | 2003-286509 A | 10/2003 | |
| JP | 2004-283823 A | 10/2004 | |
| JP | 2005-185956 A | 7/2005 | |
| JP | 2010-088957 A | 4/2010 | |
| JP | 4674921 B2 | 4/2011 | |
| WO | 2005/016503 A2 | 2/2005 | |
| WO | 2008/088027 A1 | 7/2008 | |
| WO | WO 2009054462 A1 * | 4/2009 | |

* cited by examiner

NO reactivity of Ag-Ni/Al$_2$O$_3$

NO reactivity of Au-Ni/Al$_2$O$_3$

$NO_x$ PURIFICATION CATALYST AND METHOD OF PRODUCING THE SAME

CROSS REFERENCE TO RELATED APPLICATIONS

This application is a National Stage of International Application No. PCT/JP2011/066030 filed Jul. 7, 2011, the contents of all of which are incorporated herein by reference in their entirety.

TECHNICAL FIELD

The present invention relates to a nitrogen oxide (hereinafter, may be also abbreviated as $NO_x$) purification catalyst and a method of producing the same. More particularly, the present invention relates to a novel $NO_x$ purification catalyst in which particulates consisting of specifically of two kinds of metals are supported on a metal oxide carrier and to a method of producing the same.

BACKGROUND ART

In recent years, from the standpoint of global environmental protection, emission regulations have been enforced worldwide. As a measure therefor, exhaust gas purification catalysts are used in internal-combustion engines. In such exhaust gas purification catalysts, in order to efficiently remove the ternary component of HC (hydrocarbon), CO and $NO_x$ in an exhaust gas, noble metals such as Pt, Pd and Rh are used as a catalyst component.

The reason is that exhaust gas purification catalyst in which a metal other than the aforementioned noble metals, for example, a base metal, is supported on a metal oxide carrier commonly used as a carrier in exhaust gas purification catalysts have hitherto exhibited low purification performance for the aforementioned three components in exhaust gases, particularly $NO_x$.

In automobiles using an exhaust gas purification catalyst in which the aforementioned noble metal is supported on a metal oxide carrier, such as gasoline-powered vehicles and diesel-powered vehicles, in order to improve not only catalytic activity but also fuel efficiency, a variety of systems are used. For example, during steady-state operation, combustion is carried out such that the air-fuel ratio is lean (excess oxygen) in order to improve fuel efficiency. However, in order to improve catalytic activity, it is necessary to temporarily carry out catalysis in a stoichiometric (theoretical air-fuel ratio (A/F)=14.6) to rich (excess fuel) condition.

Therefore, in noble metal-based exhaust gas purification catalysts, an exhaust gas purification catalyst in which the effect of the gas composition of the exhaust gas on the catalytic activity is small is demanded.

All of the aforementioned noble metal catalysts have the problem of resource depletion. Therefore, there is a demand for a purification catalyst which utilizes another noble metal such as silver, which is relatively abundant compared the aforementioned Pt, Pd and Rh, individually or in combination with other base metal(s) and which can exhibit purification performance comparable to conventional noble metal-based catalysts.

Accordingly, various improvements have been attempted to exhaust gas purification catalysts comprising two kinds of metals including noble metals.

For example, JP H11-342339A discloses an exhaust gas purification catalyst comprising a first catalyst for oxidizing NO to $NO_2$ and a second catalyst which cracks HC having a large number of carbon atoms to HC having a small number of carbon atoms and reduces $NO_2$ by allowing the thus cracked HC to react with $NO_2$, the first of these catalyst contains Ag and Ni as catalytic metals, the first catalyst being supported on a carrier and the amount of the supported Ag and Ni being 20 to 60 g and 20 to 50 g, respectively, with respect to 1 L of the carrier. In addition, as a concrete example, it has been shown that Ag—Ni/$Al_2O_3$ (co-impregnation) utilizes HC having a large number of carbon atoms and exhibits high NO conversion efficiency (NO-to-$NO_2$ conversion efficiency). However, the aforementioned exhaust gas purification catalyst cannot attain $NO_2$ purification performance in one step.

Further, WO 2008-088027 discloses an exhaust gas purification device which comprises an oxidation catalyst and oxidizes particulate matters (PM) present in exhaust gas using metal oxide particulates, in which oxidation catalyst metal oxide particulates having an average primary particle diameter of 1 to 400 nm are dispersed on a catalytic metal support made of a first metal of at least one selected from the group consisting of Ag, Pt, Rh, Pd, Ru, Ir, Os, Au and Cu, the metal oxide particulates being selected from the group consisting of: oxides in which the metal has a variable valance and is one of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, V, Zn and Sn; solid solutions thereof; and composite oxides thereof. In addition, as a concrete example, it is shown that the exhaust gas purification device, which was obtained by adding an aqueous solution of Ce salt, La salt and Ag salt to ammonia water and coating aggregates prepared from the thus obtained solution by calcination onto DPF (made of cordierite), exhibits favorable PM oxidation performance.

Furthermore, JP 2010-88957A discloses an exhaust gas purification catalyst which comprises a porous metal having pores of 1 to 15 nm, the porous metal containing at least one metal selected from the group consisting of Ru, Os, Rh, Ir, Pd, Pt, Ag and Au and at least one metal selected from the group consisting of Fe, Cu, Co and Ni. In addition, as a concrete example, it is shown that the exhaust gas purification catalyst, which was prepared by annealing and powdering an intermetallic compound obtained by melting and cooling Au and Al in an arc melting furnace device and by subsequently eluting Al with an alkali or acid, has superior CO oxidation performance.

PRIOR ART DOCUMENTS

Patent Documents

Patent Document 1 JP H11-342339A
Patent Document 2 WO 2008-088027
Patent Document 3 JP 2010-88957A

SUMMARY OF THE INVENTION

Problems to be Solved by the Invention

However, in the prior arts described above, it is difficult to obtain a purification catalyst which utilizes a noble metal other than Au, Pt, Pd or Rh as one of the catalyst components and which exhibits $NO_x$ purification performance without adjustment to a special gas composition.

Therefore, an object of the present invention is to provide a $NO_x$ purification catalyst which utilizes Ag as one of the catalyst components and which is capable of exhibiting $NO_x$ purification performance without adjusting conditions to a special exhaust gas composition. Further, another object of the present invention is to provide a method of producing a $NO_x$ purification catalyst which utilizes Ag as one of the catalyst components and is capable of exhibiting $NO_x$ purification performance without adjusting conditions to a special exhaust gas composition.

Means for Solving the Problems

In order to achieve the aforementioned objects, the present inventors, as a result of carrying out experiments, discovered that the decomposition reaction of $NO_x$ proceeds as follows: adsorption $NO_x$→desorption of $N_2$ and $O_2$, and that a material capable of promoting this reaction can have $NO_x$ purification performance. The present inventors carried out further investigations, thereby completing the present invention.

The present invention relates to a nitrogen oxide purification catalyst (hereinafter, may be abbreviated as $NO_x$ purification catalyst) in which particulates are supported on a metal oxide carrier, wherein the aforementioned particulates consist of Ag and Ni and the aforementioned Ag and Ni are at least partially alloyed.

In addition, the present invention relates to a method of producing a nitrogen oxide purification catalyst, comprising the steps of:

preparing a mixture containing a silver salt, a nickel salt and a polymer used as a protecting agent, in which mixture the ratio of the silver salt and the nickel salt is a ratio at which the ratio of Ag with respect to the total amount of Ag and Ni is 10 to 90 at %;

preparing a colloidal suspension by mixing the aforementioned mixture and a reducing agent;

mixing the aforementioned suspension and a metal oxide carrier;

removing solvent from the thus obtained mixture to obtain a colloidal precipitate; and activating the thus obtained colloidal precipitate.

In the present invention, the phrase "Ag and Ni are at least partially alloyed" means either that, when the X-ray diffraction peaks of the particulates supported on the carrier are measured for a catalyst sample in accordance with the measurement method described later in detail in the section of Examples, the Ag diffraction peak is shown to have shifted to higher angle relative to the Ag peak between the Ag peak ($2\theta=38$ deg) and the Ni peak ($2\theta=44.5$ deg); or that, when the TEM image of the particulates supported on carrier particles is analyzed by TEM-EDX, both Ag and Ni elements are shown to be contained in an individual particle. In order to verify the aforementioned alloying, a suitable method is selected from the above-described two verification means depending on the type of the metal oxide carrier. For example, the former may be selected in the case of $Al_2O_3$, while the latter may be selected in the case of $SiO_2$.

Further, in the present specification, the phrase "without adjustment to a special exhaust gas composition" means that the exhaust gas composition is, without any treatment by which to allow it to contain high-carbon-number HC, modified such as to remove a part of the aforementioned three components or the like, in a stoichiometric condition where it can contain low-carbon-number HC, CO and $NO_x$ such as are generally present in an exhaust gas.

According to the present invention, a $NO_x$ purification catalyst which utilizes Ag as a catalytic noble metal component and is capable of exhibiting $NO_x$ purification performance without adjustment to a special exhaust gas composition can be obtained.

Furthermore, according to the present invention, a $NO_x$ purification catalyst which utilizes Ag as a catalytic noble metal component and is capable of exhibiting $NO_x$ purification performance without adjustment to a special exhaust gas composition can be easily obtained.

MODES FOR CARRYING OUT THE INVENTION

In particular, in the present invention, there are the following embodiments:

1) The aforementioned catalyst, wherein the aforementioned at least partial alloying is one indicated by the fact that measured X-ray diffraction peaks of the particulates supported on the carrier are confirmed to have shifted to the side of higher angle relative to peaks for Ag, or one indicated by the fact that the existence of both Ag and Ni elements on the same carrier is confirmed by TEM-EDX analysis of TEM images of the particulates.
2) The aforementioned catalyst, wherein the ratio of the Ag with respect to the total amount of the Ag and Ni in the aforementioned particulates is 20 to 90 at %.
3) The aforementioned catalyst, wherein the aforementioned metal oxide carrier is $Al_2O_3$ particles, $SiO_2$ particles, $CeO_2$ particles, $ZrO_2$ particles, $TiO_2$ particles, $CeO_2$—$ZrO_2$ composite oxide particles, $CeO_2$—$Al_2O_3$ composite oxide particles, $CeO_2$—$TiO_2$ composite oxide particles, $CeO_2$—$SiO_2$ composite oxide particles or $CeO_2$—$ZrO_2$—$Al_2O_3$ composite oxide particles.
4) The aforementioned, wherein the aforementioned activation is performed by heating at a temperature of not less than 200° C.

In the $NO_x$ purification catalyst according to the present invention, particulates consisting of Ag and Ni are supported on a metal oxide carrier and the aforementioned Ag and Ni are at least partially alloyed to each other, so that the $NO_x$ purification catalyst can exhibit $NO_x$ purification performance without adjustment to a special exhaust gas composition.

The modes for carrying out the present invention will now be described in detail with reference to the figures.

Figure 1:
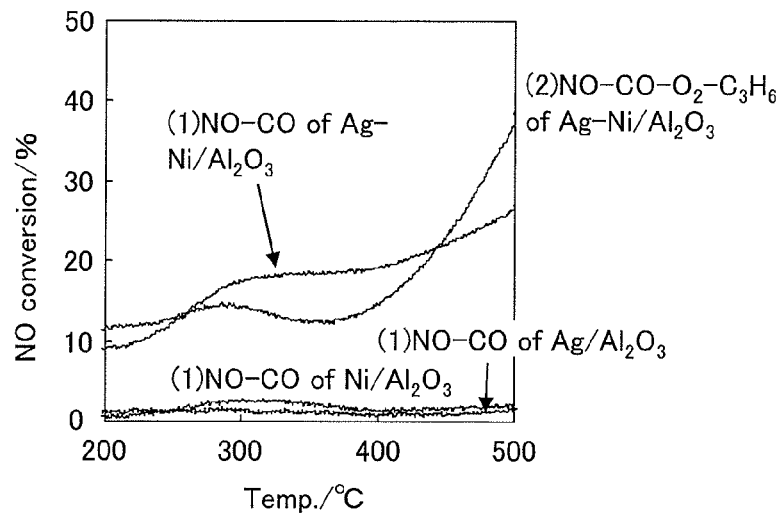
FIG. 1 is a graph comparing the NO reaction activity between the $NO_x$ purification catalyst obtained in an Example in which particulates containing Ag and Ni are supported on $Al_2O_3$ carrier (hereinafter, may be also simply referred to as Ag—Ni/$Al_2O_3$-based $NO_x$ purification catalyst or Ag—Ni/$Al_2O_3$) and an exhaust gas purification catalyst which is outside the scope of the present invention.

Referring to FIG. 1, it is confirmed that the Ag—Ni/$Al_2O_3$ according to an embodiment of the present invention exhibits prominent NO reaction activity as compared to the Ag/$Al_2O_3$ and Ni/$Al_2O_3$. In addition, it is confirmed that the Ag—Ni/$Al_2O_3$ exhibits high NO purification activity also under the ternary gas atmosphere simulating an actual exhaust gas (the curve (2) in FIG. 1).

Figure 2:
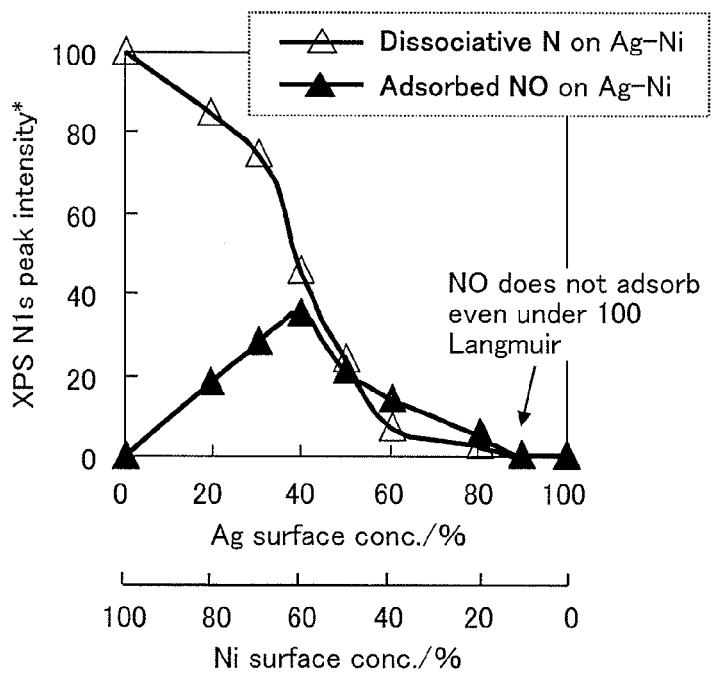
FIG. 2 is a graph showing the relationship between the surface Ni concentrations of single-element metal and binary metal particles after adsorption of 1 Langmuir of NO at room temperature and the N1s peak intensity.

Referring to FIG. 2, based on the surface concentrations of the single-element metal and binary metal after adsorption of 1 Langmuir of NO at room temperature and the N1s peak intensity, it is shown that NO does not adsorb when the Ag concentration on the binary metal surface is greater than 90 at % and that, therefore, NO cannot be purified.

From this, it is understood that, in the present invention, the ratio of Ag with respect to the total amount of Ag and Ni in the particulates is not higher than 90 at %.

Figure 3:
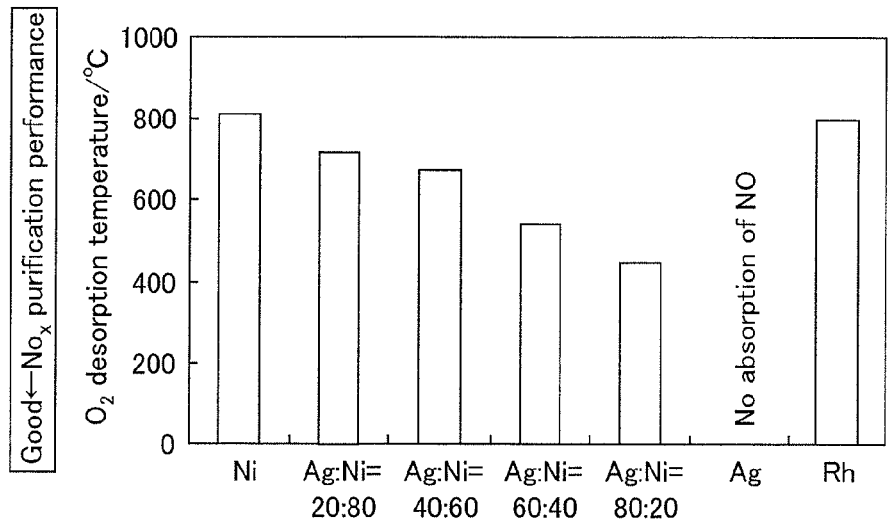
FIG. 3 is a graph showing the results of measuring the NO thermal desorption temperature on thin films of alloys and single metals by in-situ XPS.

Referring to FIG. 3, the Ag—Ni bimetals imitating the catalyst according to an embodiment of the present invention have an oxygen desorption temperature of about 800° C. or lower and, as described in the above, the decomposition reaction of $NO_x$ proceeds as follows: adsorption $NO_x \rightarrow$ desorption of $N_2$ and $O_2$; therefore, it is shown that the Ag—Ni bimetals can have low-temperature $NO_x$ purification performance equal to or greater than Rh, which exhibits oxygen desorption temperature of about 800° C. or higher.

In addition, from FIG. 3, it is understood that, in the $NO_x$ purification catalyst according to the present invention, the ratio of Ag with respect to the total amount of Ag and Ni in the particulates is should not be less than 10 at %, particularly and ideally not less than 20 at %.

Figure 4:
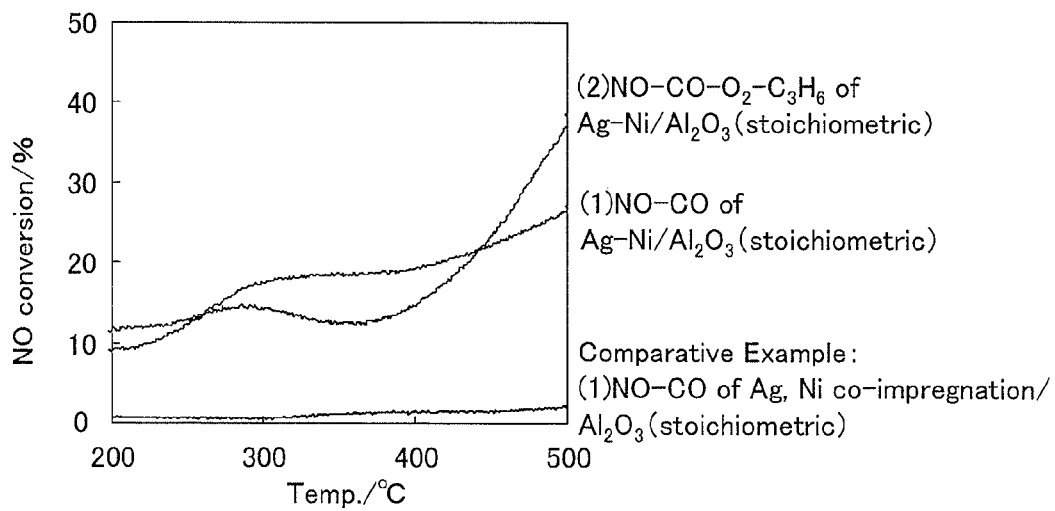
FIG. 4 is a graph comparing the NO reaction activity between the Ag—Ni/$Al_2O_3$-based $NO_x$ purification catalyst obtained in an Example and an exhaust gas purification catalyst in which Ag and Ni were co-impregnated on $Al_2O_3$ carrier, which catalyst is outside the scope of the present invention (hereinafter, may be also simply abbreviated as Ag, Ni co-impregnation/$Al_2O_3$-based $NO_x$ purification catalyst or Ag, Ni co-impregnation/$Al_2O_3$).

Referring to FIG. 4, it is understood that the Ag—Ni/$Al_2O_3$, which is the $NO_x$ purification catalyst according to an embodiment of the present invention, exhibits high NO reaction activity in a wide temperature range of 200 to 500° C. not only under the binary gas atmosphere as shown by the curve (1), but also under the quaternary gas atmosphere simulating an actual exhaust gas as shown by the curve (2). In contrast to this, it is understood that the Ag, Ni co-impregnation/$Al_2O_3$-based $NO_x$ purification catalyst, which is outside the scope of the present invention, only exhibits extremely low NO reaction activity in the aforementioned temperature range.

Figure 5:
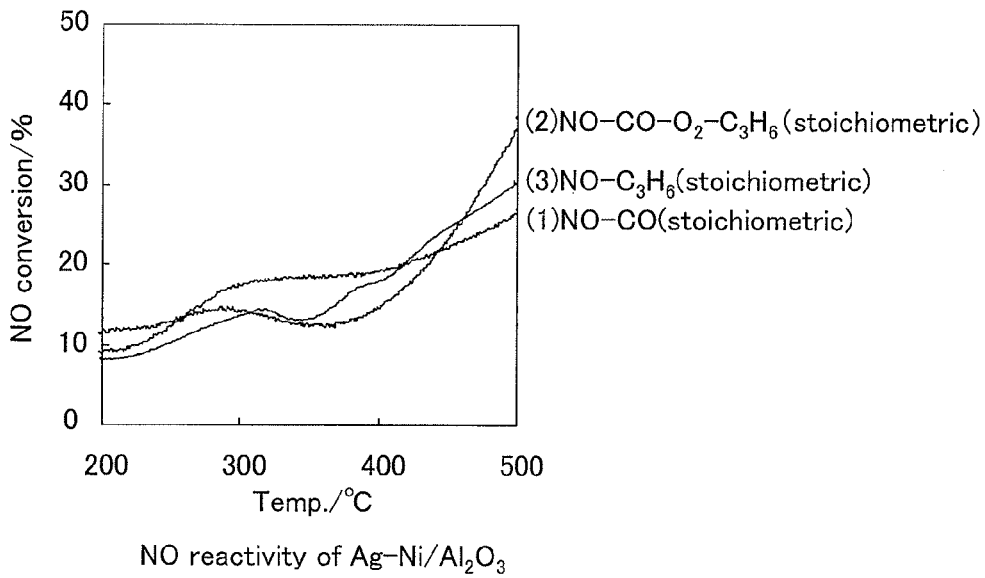
FIG. 5 is a graph showing the NO reaction activity of the Ag—Ni/$Al_2O_3$-based $NO_x$ purification catalyst obtained in an Example of the present invention in various gas compositions.

Further, referring to FIG. 5, it is understood that Ag—Ni/$Al_2O_3$, which is the $NO_x$ purification catalyst according to an embodiment of the present invention, exhibits high NO reaction activity in a wide temperature range of 200 to 500° C. in all of the cases where the gas composition is NO—CO (stoichiometric) (shown by the curve (1)), NO—OO—$O_2$—$C_3H_6$ (stoichiometric) (shown by the curve (2)) and NO—$C_3H_6$ (stoichiometric) (shown by the curve (3)).

Figure 6:
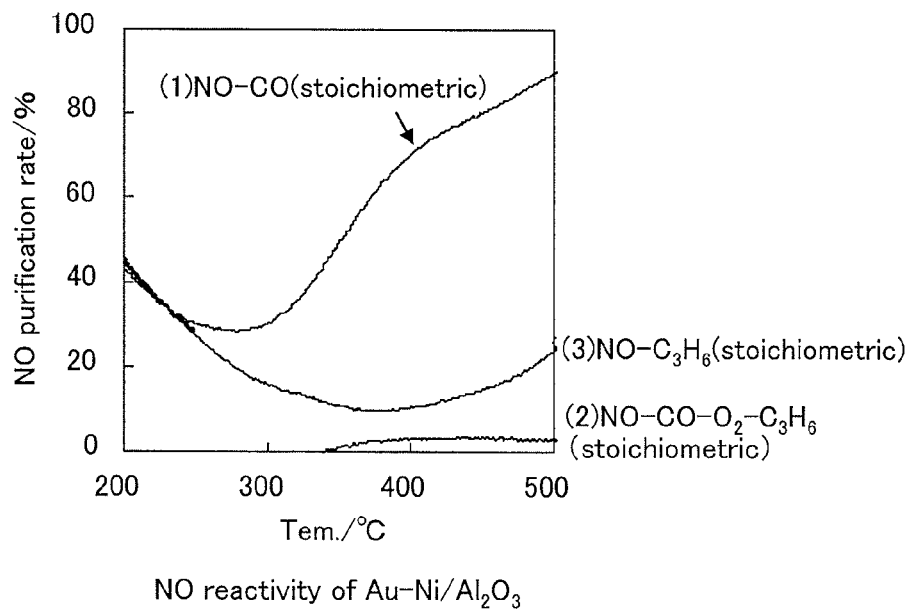
FIG. 6 is a graph showing the NO reaction activity of a nitrogen oxide purification catalyst in which particulates of alloyed Au and Ni are supported on $Al_2O_3$ carrier, which catalyst is outside the scope of the present invention (hereinafter, may be also simply abbreviated as Au—Ni/$Al_2O_3$-based $NO_x$ purification catalyst) in various exhaust gas compositions.

In contrast to this, referring to FIG. 6, it is understood that, although the Au—Ni/$Al_2O_3$, which is a $NO_x$ purification catalyst not encompassed by the scope of the present invention, exhibits high NO reaction activity in a wide temperature range of 200 to 500° C. in the case where the gas composition is NO—CO (stoichiometric) as shown by the curve (1), it exhibits relatively low NO reaction activity in a temperature range of 300 to 500° C. in the case where the gas composition is NO—$C_3H_6$ (stoichiometric) (shown by the curve (3)) and extremely low NO reaction activity in the case where the gas composition is NO—CO—$O_2$—$C_3H_6$ (stoichiometric) (shown by the curve (2)).

Figure 7:
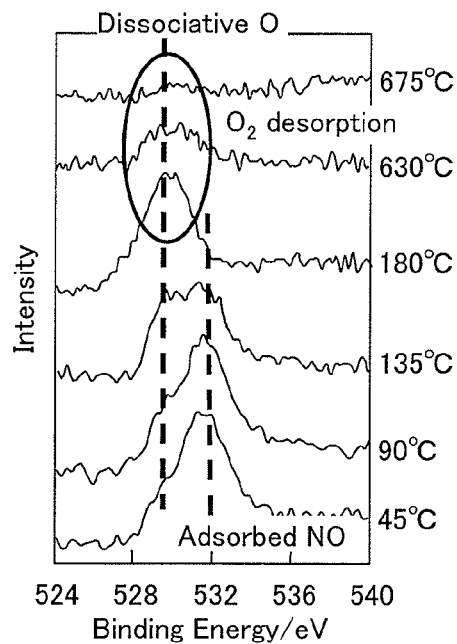
FIG. 7 shows the O1s spectra on Ag—Ni alloy thin film at different temperatures obtained by XPS.

Referring to FIG. 7, in the Ag—Ni alloy thin film which was prepared to examine the properties of the $NO_x$ purification catalyst according to an embodiment of the present invention, based on the changes in the O1s spectra, it is confirmed that, when the temperature of the Ag—Ni alloy thin film to which 1 Langmuir of NO was allowed to adsorb was increased at 4° C./min, partially dissociated and adsorbed NO became completely dissociated at about 180° C., and that the peak for the dissociated and adsorbed O disappeared when the temperature of the film was further increased beyond 600° C.

Figure 8:
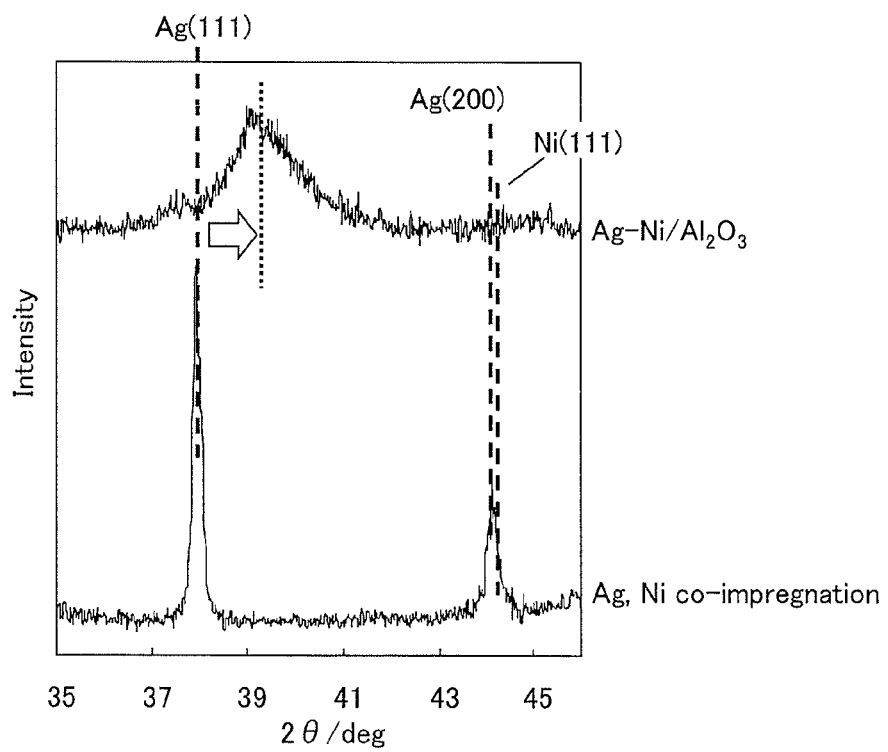
FIG. 8 shows X-ray diffraction data for the metal particulates of a nitrogen oxide purification catalyst obtained in an Example in which particulates of alloyed Ag and Ni are supported on $SiO_2$ carrier (hereinafter, may be also simply abbreviated as Ag—Ni/$SiO_2$-based $NO_x$ purification catalyst or Ag—Ni/$SiO_2$) and an exhaust gas purification catalyst in which Ag and Ni were co-impregnated on $SiO_2$ carrier, which catalyst is outside the scope of the present invention (hereinafter, may also be simply abbreviated as Ag, Ni co-impregnation/$SiO_2$-based $NO_x$ purification catalyst or Ag, Ni co-impregnation/$SiO_2$).

Furthermore, as shown in FIG. 8, in the Ag—Ni/$SiO_2$ according to an embodiment of the present invention, the X-ray diffraction peaks of the metal particulates supported on the carrier particles, which were measured for the catalyst sample in accordance with the measurement method described later in detail in the section of Examples, shows a peak between the Ag peak (2θ=38 deg) and the Ni peak (2θ=44.5 deg), ideally in the range of 38.5 to 43.7°, and most particularly in the range of 39.0 to 43.0°. From this, it is believed that Ag and Ni are at least partially alloyed to each other. It is noted here that more detailed examinations have revealed that Ag in an alloy state of 10 to 90 at % has a diffraction peak in the range of 38.5 to 43.7°.

In contrast to this, it is confirmed that the Ag, Ni co-impregnation/$SiO_2$, which is outside the scope of the present invention, shows two peaks of Ag (111) and Ni (111). From this, it is believed that, in the Ag, Ni co-impregnation/$SiO_2$, Ag and Ni are not alloyed.

Figure 9A:
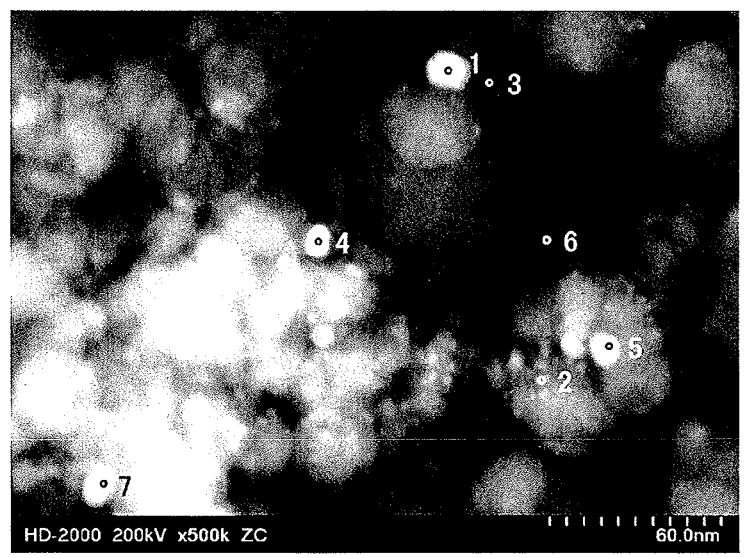
FIG. 9A shows a TEM image of the Ag—Ni/$Al_2O_3$-based $NO_x$ purification catalyst obtained in an Example.
Figure 9B:
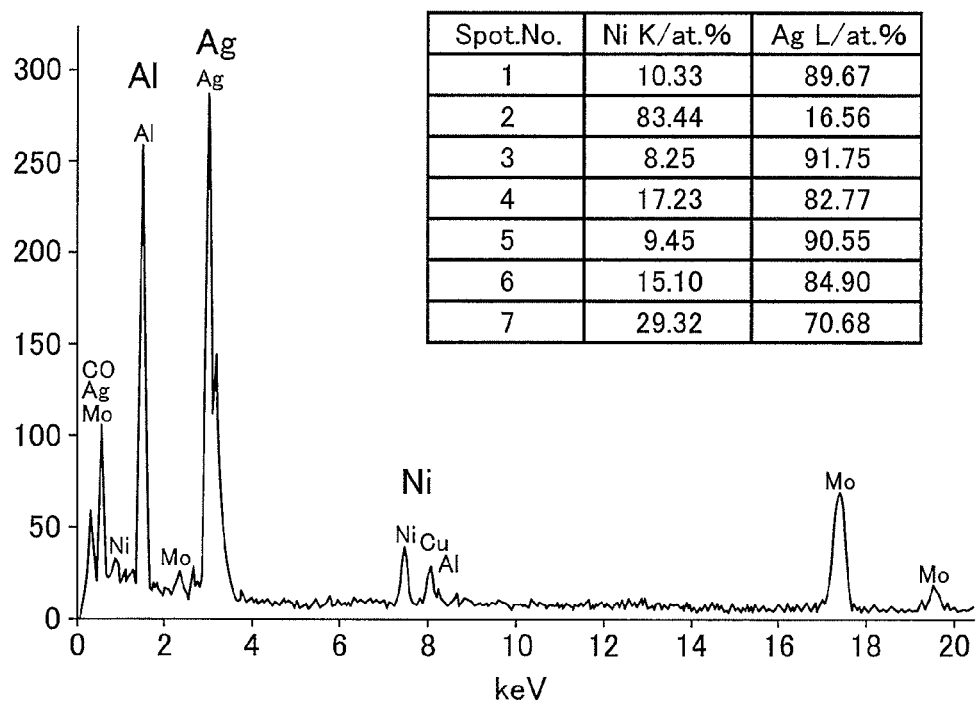
FIG. 9B shows the results of TEM-EDX analyses performed on seven arbitrary particulates in the TEM image shown in FIG. 9A.

In addition, as shown in FIGS. 9A and 9B, in the Ag—Ni/$Al_2O_3$ according to an embodiment of the present invention, when the TEM image of the catalyst sample is analyzed by TEM-EDX in accordance with the method described later in detail in the section of Examples, all of the seven arbitrarily selected particulates are shown to contain both elements Ag and Ni on the same carrier. From this as well, it is believed that, in the Ag—Ni/$Al_2O_3$ according to an embodiment of the present invention, Ag and Ni are at least partially alloyed.

Figure 10A:
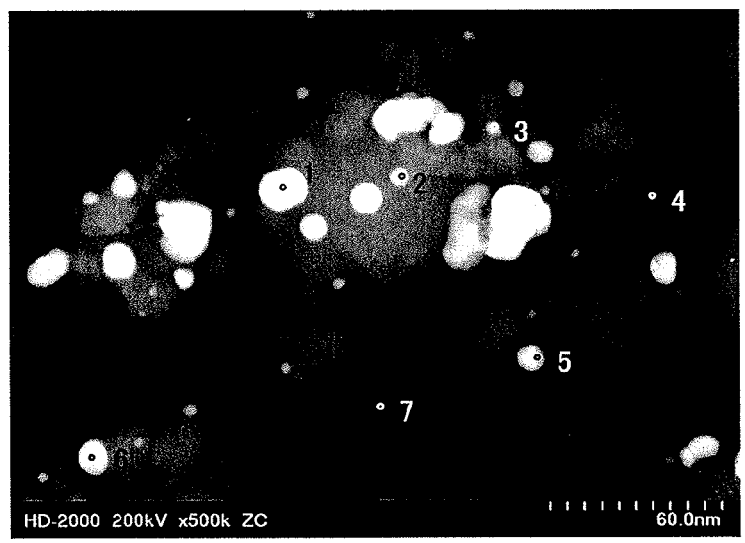
FIG. 10A shows a TEM image of the Ag, Ni impregnation/$Al_2O_3$-based $NO_x$ purification catalyst which is outside the scope of the present invention.
Figure 10B:
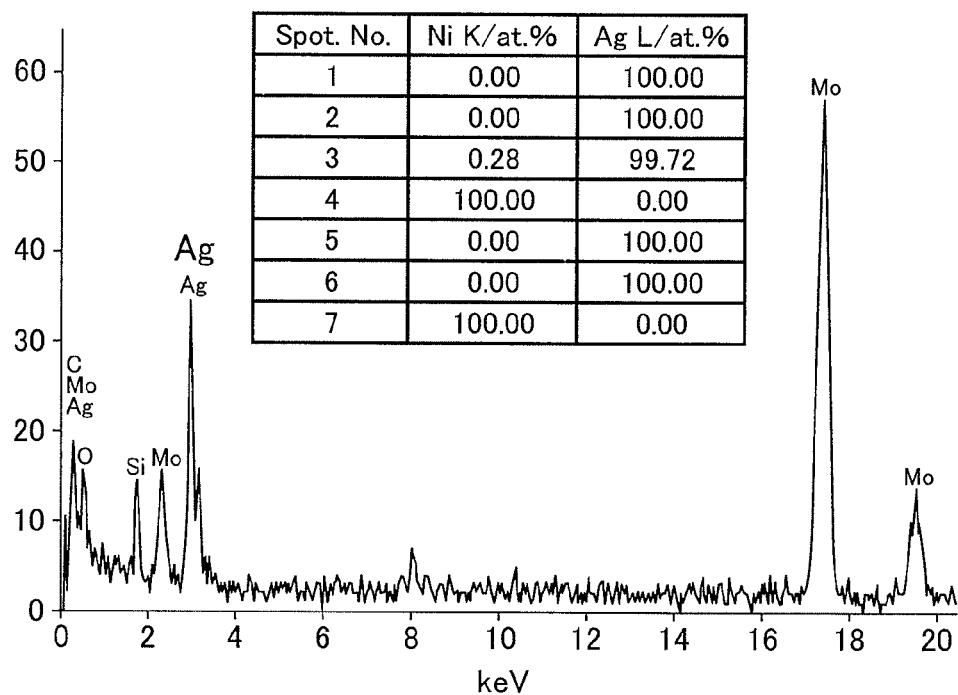
FIG. 10B shows the results of TEM-EDX analyses performed on seven arbitrary particulates in the TEM image shown in FIG. 10A.

In contrast to this, as shown in FIGS. 10A and 10B, in the Ag, Ni co-impregnation/$Al_2O_3$ which is outside the scope of the present invention, when the TEM image of the catalyst sample is analyzed by TEM-EDX in accordance with the method described later in detail in the section of Examples, all of the seven arbitrarily selected particulates are shown to contain only a single element out of either Ag or Ni on the same carrier. From this as well, in the Ag, Ni co-impregnation/$Al_2O_3$, it is believed that Ag and Ni are not alloyed.

In the $NO_x$ purification catalyst according to the present invention, examples of the metal oxide carrier on which Ag and Ni are supported include $Al_2O_3$ particles, $SiO_2$ particles, $CeO_2$ particles, $ZrO_2$ particles, $TiO_2$ particles, $CeO_2$—$ZrO_2$ composite oxide particles, $CeO_2$—$Al_2O_3$ composite oxide particles, $CeO_2$—$TiO_2$ composite oxide particles, $CeO_2$—$SiO_2$ composite oxide particles and $CeO_2$—$ZrO_2$—$Al_2O_3$ composite oxide particles.

In the $NO_x$ purification catalyst according to the present invention, particulates which are binary alloy particles consisting of Ag and Ni are supported on the aforementioned metal oxide carrier and the Ag and Ni are at least partially alloyed when supported.

The $NO_x$ purification catalyst according to the present invention can be obtained by, for example, a method comprising the steps of:

preparing a mixture containing a silver salt, a nickel salt and a polymer used as a protecting agent, in which mixture the ratio of the silver salt and the nickel salt are present at a ratio whereby the ratio of Ag with respect to the total amount of Ag and Ni becomes 10 to 90 at %;

preparing a colloidal suspension by mixing the aforementioned mixture and a reducing agent;

mixing the aforementioned suspension and a metal oxide carrier;

removing solvent from the thus obtained mixture to obtain a colloidal precipitate; and activating the thus obtained colloidal precipitate.

Examples of the aforementioned silver salt include inorganic acid salts such as silver nitrate, silver sulfate, silver fluoride, silver chlorate, silver bromate, silver tetrafluoroborate, silver hexafluorophosphate and silver phosphate; and organic acid salts such as silver acetate and silver oxalate.

The aforementioned silver salt can be used as an aqueous solution thereof or as an organic solvent solution thereof, such as an alcohol solution or polyol solution of the silver salt.

Examples of the aforementioned nickel salt include nickel sulfate, nickel nitrate, nickel chloride, nickel bromide, nickel acetate and nickel hydroxide. The nickel salt may be a hydrate.

The aforementioned nickel salt can be usually used as an aqueous solution thereof or as an organic solvent solution thereof, such as an alcohol solution or polyol solution of the nickel salt.

Examples of the aforementioned polymer used as a protecting agent include functional group-containing polymers such as poly-N-vinylpyrrolidone, polyacrylamide, copolymer of N-vinylpyrrolidone and acrylic acid, polyvinyl methylketone, poly(4-vinylphenol), oxazoline polymers, polyalkylene imines and polyvinyl pyridine.

The amount of the aforementioned polymer used as a protecting agent can be 1 to 20 times (mass ratio), particularly 2 to 10 times (mass ratio), with respect to the total amount of the silver salt and the nickel salt.

Further, the aforementioned polymer used as a protecting agent can be usually used as an organic solvent solution thereof, for example, as an alcohol solution such in methanol or ethanol.

In the aforementioned step, the mixture of a silver salt, a nickel salt and a polymer used as a protecting agent can be prepared usually by mixing a solution containing the silver salt, a solution containing the nickel salt and a solution containing the polymer used as a protecting agent. Further, the aforementioned mixture can be prepared by mixing the solutions in a container with stirring after, as required, heating or cooling each of the solutions. In the aforementioned method, the ratio of the aforementioned silver salt and the aforementioned nickel salt is one of which the ratio of Ag with respect to the total amount of Ag and Ni becomes 10 to 90 at %, particularly 20 to 80 at %, more particularly 20 to 60 at %. When the ratio of the silver salt and the nickel salt is outside the aforementioned range, the $NO_x$ purification performance of the resulting $NO_x$ purification catalyst can be impaired.

In the aforementioned method, a colloidal suspension is prepared by mixing the mixture obtained in the aforementioned step with a reducing agent.

Examples of the aforementioned reducing agent include alcohols and polyols such as ethylene glycol, diethylene glycol, triethylene glycol, tetraethylene glycol, 1,2-propanediol, dipropylene glycol, 1,2-butanediol, 1,3-butanediol, 1,4-butanediol, 2,3-butanediol, 1,5-pentanediol and polyethylene glycol; hydrazines; and boron compounds such as dimethylamino boron, diethylamino boron, sodium borohydride, boron hydride and ammonia borane.

The amount of the aforementioned reducing agent varies depending on the type thereof; however, in general, it can be 0.1 to 10 times (mass ratio), particularly about 0.2 to 2 times (mass ratio) with respect to the total amount of the silver salt and the nickel salt.

In the aforementioned method, a $NO_x$ purification catalyst is obtained by the steps of:

mixing the colloidal suspension obtained in the aforementioned manner with a metal oxide carrier;

removing solvent from the thus obtained mixture to obtain a colloidal precipitate; and activating the thus obtained colloidal precipitate.

In the aforementioned method, the ratio of the colloidal suspension and the metal oxide carrier can be a ratio at which, with respect to the amount of the metal oxide carrier, the total amount of the supported Ag and Ni becomes 0.05 to 10% by mass, particularly 0.5 to 5% by mass.

In the aforementioned step, examples of the method of removing solvent from the mixture of the colloidal suspension and the metal oxide carrier include a method in which solvent is removed under reduced pressure.

In the aforementioned step, it is required that the colloidal precipitate obtained by removing solvent from the mixture in the aforementioned manner be activated.

The aforementioned activation can be performed in order to remove the polymer which is a protecting agent that may remain in the colloidal precipitate. For example, heating (including at reduced pressure), centrifugation, ultrasonic method, extraction methods or a combination of these may be used, with the heating methods being preferable.

In order to remove the aforementioned protecting agent, prior to the heating, the mixture may be, as required, treated with an excessive amount (e.g. not less than 2-fold volumes, for example, 2 to 20-fold volumes, with respect to the aforementioned mixture) of an organic solvent such as a ketone (e.g. acetone, methylethyl ketone or methylbutyl ketone) or an ether (e.g. THF), but preferably a ketone.

Examples of the aforementioned heating method include a method in which heating is performed, for example, at a temperature of not less than 200° C., such as at a temperature of 200 to 300° C. or 500° C. at reduced pressure. The aforementioned heating can be performed usually for about 0.1 to 2 hours under vacuum.

The $NO_x$ purification catalyst according to the present invention obtained by the aforementioned steps may be, as required, compression-molded into a pellet for use.

In the NO$_x$ purification catalyst obtained by the aforementioned method, the average particle diameter of the Ag—Ni particulates supported on a metal oxide carrier, which particulates consist of Ag and Ni that are at least partially alloyed, may be about 0.2 to 100 nm.

The NO$_x$ purification catalyst according to the present invention has superior NO$_x$ purification performance as the result of a synergy effect, which could not be attained by a single metal out of Ag or Ni, as well as particularly superior catalytic activity even compared to other alloys and single noble metals such as Rh.

EXAMPLES

Examples of the present invention will now be described.
In the following examples, the following carriers were used:
Al$_2$O$_3$: manufactured by C.I. Kasei Co., Ltd. (γ-Al$_2$O$_3$)
SiO$_2$: manufactured by C.I. Kasei Co., Ltd. (trade name: NanoTek).
In the following examples, the obtained samples were evaluated in accordance with the measurement method described below. The measurement method is not restricted to the one described below, and any method can be employed as long as it is considered to be equivalent by those skilled in the art.
1. Measurement of the NO dissociative adsorption temperature and N$_2$ desorption temperature
   Measurement method: measurement of XPS (X-ray photoelectron spectroscopy) spectra with changes in the heating temperature
   The NO dissociative adsorption temperature is defined as a temperature at which partially dissociated and adsorbed NO becomes completely dissociated when the temperature of Ag—Ni alloy thin film to which 1 Langmuir of NO was allowed to adsorb is increased at 4° C./min. The N$_2$ desorption temperature is defined as a temperature at which the peak of dissociated and adsorbed O disappears when the temperature of the film is further increased.
   Measuring device: φESCA1600
2. Measurement of X-ray diffraction peaks of the particulates
   Measurement method: X-ray diffraction (XRD) measurement
   Measuring device: RIGAKU RINT 2000
3. Measurement of particle shape and particle size distribution of alloy nanoparticles
   HRTEM measuring device: HITACHI HD2000
4. Elemental analysis of alloy nanoparticles
   Measurement method: measurement of composition ratio by TEM-EDS (EDS: energy dispersive X-ray spectroscopy)
   TEM-EDS measuring device: HITACHI HD 2000
5. Evaluation of NO dissociative adsorption properties
   Measurement method: The binding energy is measured based on the N1s XPS spectra.
   Device: φESCA 1600
6. Measurement of catalyst activity
   A catalyst pellet is packed into a glass reaction tube and fixed with glass wool. The flow rate is balanced with a gas having the respective composition and N$_2$, and a pre-mixed gas is allowed to flow through the glass reaction tube. The gas temperature is increased from 100° C. to 500° C. at a heating rate of 20° C./min. The NO concentration is measured by using an exhaust gas analyzer (HORIBA MEXA 7100H) or by MS (mass spectrometry).

Reference Example 1

In order to examine the effect of Ag—Ni alloy, an Ag—Ni alloy thin film (Ag:Ni=40:60 (at)) was prepared by Ag ion sputtering and Ni-PLD (Pulsed Laser Deposition).

In order to analyze the NO elementary reaction by in-situ XPS, 1 Langmuir of NO was allowed to adsorb onto the Ag—Ni thin film.

After allowing 1 Langmuir of NO to adsorb onto the Ag—Ni thin film, in the process of increasing the temperature thereof at 4° C./min, O1s spectra were measured. The results thereof are shown in Table 7.

As shown in FIG. 7, the partially dissociated and adsorbed NO becomes completely dissociated at about 180° C., and when the temperature exceeds 600° C., the peak for dissociated and adsorbed O disappears.

By defining these temperatures as the NO dissociative adsorption temperature and N$_2$ desorption temperature, respectively, the O$_2$ desorption temperature was determined from the O1s spectra in the same manner. The results are shown in FIGS. 2 and 3 along with other results.

Reference Examples 2 to 4

An Ag—Ni thin film was prepared and evaluated in the same manner as in Reference Example 1 except that the ratio of Ag to Ni (Ag:Ni) was changed from 40:60 (at. ratio) to 20:80, 60:40 or 80:20 (all of which are at. ratio).

The results of the evaluation are shown in FIGS. 2 and 3 along with other results.

Comparative Reference Examples 1 and 2

In place of the Ag—Ni alloy whose Ag:Ni is 40:60, metal thin films made of Ag alone or Ni alone were prepared and evaluated in the same manner.

The results of the evaluation are shown in FIGS. 2 and 3 along with other results.

Example 1

A catalyst was prepared by the following steps:
1. In a two-neck round-bottom flask, 1.0511 g of polyvinyl pyridine was added to 200 mL of absolute ethanol to obtain a solution (Solution 1).
2. In a vial, 0.1865 g of Ni(OAc)$_2$.4H$_2$O was dissolved in 2 mL of distilled water to obtain a solution (Solution 2).
3. In a vial, 0.0427 g of AgNO$_3$ was dissolved in 2 mL of distilled water to obtain a solution (Solution 3).
4. Solution 1 was heated to 50° C. using an oil bath and mixed until the polymer was fully dissolved.
5. Solution 1 was cooled to 0° C. using an ice bath.
6. Solution 2 was poured into Solution 1 whilst stirring to ensure homogenization.
7. Solution 3 was poured into the combined Solutions 1 and 2 whilst stirring to ensure homogenization.
8. The resulting mixture was heated to 50° C. using an oil bath and this temperature was maintained, with stirring, for two hours.
9. In order to ensure complete reduction of all the species present in the flask, sodium boron hydride (0.0697 g) was added and the solution was mixed for an additional 10 min.
10. Then, the oil bath was removed and the colloidal suspension was allowed to cool to room temperature.
11. The suspension was then left to stand.
12. The prepared nanoparticles were purified by treating an aliquot containing a desired amount of nanoparticles with a large excess of acetone (1:12 v/v). This extracted the protecting polymer to the acetone phase to remove polymer to calcine under air.
13. Decanting or centrifugation afforded purified nanoparticles.

14. After removal of the acetone layer, the purified colloids were redispersed in absolute ethanol by gentle stirring or by using an ultrasonic bath.
15. A schlenk tube was charged with 5.1127 g of support (γ-$Al_2O_3$).
16. The system was evacuated and $N_2$ was used to flush the tube completely free of air.
17. The pre-prepared colloidal suspension (120 mL, calculated concentration c=0.5925 mg/mL) was added by syringe to the Schlenk tube. The amount of the added colloid was calculated such as to obtain $4.9 \times 10^{-5}$ mol Ag/g of the support.
18. The resulting mixture was stirred overnight at room temperature, after which time the solvent was removed in vacuo.
19. The resulting colloidal precipitate was heated at 200° C. under vacuum with the aim of removing any traces of the protecting agent.
20. If necessary, the catalyst powder was compressed in order to furnish pellets less than 2 mm in size.

The thus obtained catalyst in a pellet form [Ag:Ni=1:1 (at), the supported amounts: Ag=0.52 wt %, Ni=0.29 wt %] was evaluated. It is noted here that, prior to the analyses, the catalyst was calcined at 300° C. in air and treated at 300 to 1,000° C. in a hydrogen reducing atmosphere (1%, remainder: $N_2$).

FIG. 9A shows the TEM image of the thus obtained catalyst and FIG. 9B shows the results of TEM-EDX analyses performed on seven arbitrary particulates on the carrier in the TEM image.

From FIG. 9A, in the obtained catalyst, it was confirmed that particulates (average particle diameter: 3.2 nm) consisting of Ag and Ni which were alloyed to each other were supported on the $Al_2O_3$ particles.

In addition, under the following common conditions, the performance of the thus obtained catalyst was evaluated using the following gas compositions. Common conditions: SV=100,000 (0.6 g, 1 L/min)
(1) NO: 1,500 ppm, CO: 1,500 ppm, $N_2$: remainder
(2) NO: 1,500 ppm, CO: 6,500 ppm, $C_3H_6$: 1,000 ppm, $O_2$: 7,000 ppm, $N_2$: remainder
(3) NO: 1,500 ppm, $C_3H_6$: 167 ppm, $N_2$: remainder The results of the evaluation are shown in FIGS. 1, 4 and 5 along with other results.

Comparative Example 1

The same silver salt as in Example 1 was dissolved in 100 mL of water. While stirring in another container, the silver salt solution or the nickel salt solution was poured to a suspension in which carrier ($Al_2O_3$) was placed in 200 mL of water, and the resulting mixture was left to stand for 2 hours. Thereafter, the water content was evaporated at 70 to 90° C. The thus obtained sample was dried at 120° C. for 15 hours and then calcined at 500° C. for 2 hours. The thus obtained catalyst powder was compressed to obtain a catalyst pellet of about 2 mm in size.

The performance of the thus obtained catalyst (the amount of supported Ag: 0.52 wt %) was evaluated in the same manner as in Example 1.

The results of the evaluation are shown in FIG. 1 along with other results.

Comparative Example 2

A catalyst pellet of about 2 mm in size was obtained in the same manner as in Comparative Example 1 except that the same nickel salt as in Example 1 was used in place of the silver salt of Comparative Example 1.

The performance of the thus obtained catalyst (the amount of supported Ni: 0.29 wt %) was evaluated in the same manner as in Example 1.

The results of the evaluation are shown in FIG. 1 along with other results.

Comparative Example 3

The same amounts of the same silver salt and nickel salt as in Example 1 were separately dissolved in 100 mL of water. While stirring in another container, the silver salt solution and the nickel salt solution were poured to a suspension of carrier ($Al_2O_3$) in 200 mL of water, and the resultant was left to stand for 2 hours. Thereafter, the water content was evaporated at 70 to 90° C. The thus obtained sample was dried at 120° C. for 15 hours and then calcined at 500° C. for 2 hours. The thus obtained catalyst powder was compressed to obtain a catalyst pellet of about 2 mm in size.

FIG. 10A shows the TEM image of the thus obtained Ag, Ni co-impregnation/$Al_2O_3$ catalyst [Ag:Ni=1:1 (at ratio), the supported amounts: Ag=0.52 wt %, Ni=0.29 wt %] and FIG. 10B shows the results of TEM-EDX analyses performed on seven arbitrary selected particulates on the carrier in the TEM image.

In addition, the performance of the thus obtained catalyst was evaluated in the same manner as in Example 1.

The results of the evaluation are shown in FIG. 4 along with other results.

Example 2

A catalyst was obtained in the same manner as in Example 1 except that $SiO_2$ was used as the carrier in place of $Al_2O_3$.

For the thus obtained catalyst [Ag:Ni=1:1 (at ratio), the supported amounts: Ag=0.52 wt %, Ni=0.29 wt %], X-ray diffraction was measured.

The results of the measurement are shown in FIG. 8 along with other results.

From FIG. 8, it was confirmed that in the thus obtained catalyst, particulates consisting of Ag and Ni were supported on the $SiO_2$ particles with the Ag and Ni being alloyed with each other.

Comparative Example 4

A co-impregnated catalyst was obtained in the same manner as in Comparative Example 3 except that $SiO_2$ was used as the carrier in place of $Al_2O_3$.

For the thus obtained Ag, Ni co-impregnation/$SiO_2$ catalyst [Ag:Ni=1:1 (at % ratio), the supported amounts: Ag=0.52 wt %, Ni=0.29 wt %], X-ray diffraction was measured.

The results of the measurement are shown in FIG. 8 along with other results.

From FIG. 8, it was confirmed that in the obtained catalyst, particulates consisting of Ag and Ni were supported on the $SiO_2$ particles without the Ag and Ni being alloyed.

Comparative Example 5

A catalyst was obtained in the same manner as in Example 1 except that chloroauric acid was used in place of the silver salt.

The performance of the thus obtained Au-Ni/$Al_2O_3$ catalyst [Au:Ni=1:1 (at % ratio), the supported amounts: Au=0.52 wt %, Ni=0.29 wt %] was evaluated in the same manner as in Example 1.

The results of the evaluation are shown in FIG. 6.

Industrial Applicability

From the standpoint of resource depletion, the $NO_x$ purification catalyst according to the present invention can utilize Ag and Ni existing in approximately the same amount as Cu in the earth and is capable of exhibiting favorable $NO_x$ purification performance without adjusting the exhaust gas emitted from an engine.

The invention claimed is:

1. A method of producing a nitrogen oxide purification catalyst in which particulates are supported on a metal oxide carrier, comprising the steps of:
    preparing a mixture containing a silver salt, a nickel salt and a polymer used as a protecting agent, in which mixture the ratio of said silver salt and said nickel salt is a ratio at which the ratio of Ni with respect to the total amount of Ag and Ni becomes 10 to 90 at %;
    preparing a colloidal suspension by mixing said mixture and a reducing agent;
    mixing said suspension and a metal oxide carrier, wherein the ratio of suspension and the metal oxide carrier is a ratio at which, with respect to the amount of the metal oxide carrier, the total amount of the supported Ag and Ni becomes 0.05 to 10% by mass,
    removing solvent from the thus obtained mixture to obtain a colloidal precipitate; and
    activating the thus obtained colloidal precipitate,
    wherein said particulates supported on said metal oxide carrier consist of Ag and Ni and said Ag and said Ni are at least partially alloyed.

2. The method according to claim 1, wherein said activation is performed by heating at a temperature of not less than 300° C.

3. The method according to claim 1, wherein the ratio of Ni with respect to the total amount of Ag and Ni becomes 20 to 80 at %.

4. The method according to claim 1, wherein the ratio of Ni with respect to the total amount of Ag and Ni becomes 40 to 80 at %.

5. The method according to claim 1, wherein the metal oxide carrier is selected from the group consisting of $Al_2O_3$, $SiO_2$, $CeO_2$ and $CeO_2$—$ZrO_2$.

6. The method according to claim 1, wherein the average particle diameter of the particulates is about 0.2 to 100 nm.

* * * * *